United States Patent [19]

Ceroll

[11] 3,770,551

[45] Nov. 6, 1973

[54] SPLICER TAPE ASSEMBLY FOR USE IN TAPE WINDING MACHINES

[75] Inventor: Gerald E. Ceroll, Minneapolis, Minn.

[73] Assignee: General Mills, Inc., Minneapolis, Minn.

[22] Filed: Mar. 1, 1971

[21] Appl. No.: 119,913

Related U.S. Application Data

[62] Division of Ser. No. 846,844, Aug. 1, 1969, Pat. No. 3,582,009.

[52] U.S. Cl. .................... 156/506, 83/276, 156/517, 242/56

[51] Int. Cl. ... B31f 5/00, B32b 31/18, G03d 15/04, B65h 21/00, B26d 5/20

[58] Field of Search ......... 156/505–506, 517, 510; 242/56; 83/276, 401, 409, 620

[56] References Cited

UNITED STATES PATENTS

| | | | |
|---|---|---|---|
| 3,554,842 | 1/1971 | Byrt | 156/505 |
| 3,664,903 | 5/1972 | McCorkle | 156/506 |
| 3,226,279 | 12/1965 | Allen | 156/505 |

*Primary Examiner*—Philip Dier
*Attorney*—Anthony A. Juettner et al.

[57] ABSTRACT

The machine winds magnetic recording tape supplied from a spool onto the reel of a tape cartridge. The loose or leading tape end is held in a displaced relation with the reel during most of winding, and after the winding has been completed, the wound tape is automatically severed from the remaining supply of tape. The resulting trailing end and the original leading end, which then abut each other, are spliced together to produce an endless tape array. The machine thereafter ejects the cartridge casing and reel.

3 Claims, 19 Drawing Figures

SPLICER TAPE ASSEMBLY FOR USE IN TAPE WINDING MACHINES

This application is a divisional application which was divided from copending application Ser. No. 846,844 filed Aug. 1, 1969, which issued as U.S. Pat. No. 3,582,009.

BACKGROUND OF THE INVENTION

1. Field of the Invention

This invention relates generally to tape winding machines, and pertains more particularly to a machine that automatically winds, cuts the wound tape, splices and then ejects the cartridge with the tape therein.

2. Description of the Prior Art

Various tape winding machines have been devised in the past. However, with respect to the winding of magnetic tape for use in cartridge-type recorders special problems are encountered because of the need for producing an endless tape array. The same problems also exist in other arts where an endless web must be wound on a reel for later use. One such art would be in the production of non-rewinding film strips where pictorial information is sequentially repeated, such as in connection with unattended advertising displays. In the past, the tape has previously been manually placed on a reel and then the reel rotated so as to wrap thereon a desired amount of tape. At the end of the winding period, the reel is stopped and the tape cut, thereby terminating the automatic cycle. It remains for the operator to remove the reel and to splice together the two ends of the tape to form the needed endless array. The tape and reel must then be manually placed in the cartridge casing to complete the assembly operation.

SUMMARY OF THE INVENTION

Accordingly, one object of the present invention is to minimize the amount of manual effort required to prepare a cartridge so that it is ready for use in a conventional cartridge-type tape recorder. As pointed out above, the invention will have application to other arts, and the use of the word tape herein, particularly the claims, is to be construed as embracive of various types of webs, films, flexible strips, ribbons and the like where such items are to be wound onto a reel or spool to provide a continuous or endless loop.

Another object of the invention is to provide a machine that automatically winds, cuts, splices and ejects the tape into the cartridge without intervention by the operator once the cycle has been started, thereby enabling the operator to load a second such machine.

A further object of the invention is to provide an automatic machine of the foregoing character that will be relatively simple and which can be manufactured at a relatively low cost.

Yet another object of the invention is to provide a tape winding machine that will readily handle unrecorded tape, determining the amount of tape that is wound on a time basis, but which machine can be easily modified so as to wind recorded tape, a suitable "stop" signal on the recorded tape then serving to control certain of the sequential actions.

Still another object is to provide a tape winding machine that will not continue with succeeding steps unless preceding steps have been satisfactorily completed, thereby enhancing the overall reliability of the equipment and thereby obviating improper winding cycles.

Briefly, the invention envisages a spindle assembly composed of upper and lower spindle units. The upper unit is movable vertically with respect to the lower unit and by means of a vacuum shoe carried thereon the free of leading end of the magnetic tape to be wound is first wound over or about the vacuum shoe, the elevating of the upper spindle unit then shifting the leading end so that the proper amount of magnetic tape is wound on the reel while maintaining the leading end free. Provision is made for winding at an accelerated speed on a time basis. At the end of the selected period, the upper spindle unit is automatically lowered and the final winding step wraps a section of tape over the leading tape end held on the vacuum shoe. The spindle assembly is always started from a specific angular position and is stopped at the same angular position when the winding has been completed. When it is stopped after the winding has been completed, a knife assembly cuts the tape and a splicing assembly thereafter moves a section of splicing tape into an overlying relationship with the abutting ends of the tape resulting from the cutting step. An ejection mechanism then pushes upwardly against the cartridge casing, forcing the casing upwardly against the reel so that the entire cartridge is raised. The cartridge is then removed from the machine and the cover or top plate manually secured in place to enclose the reel and the tape wound thereon, only a section of tape being exposed so as to make engagement with the recording and/or playback head of a conventional cartridge-type tape recorder.

Figure 1:
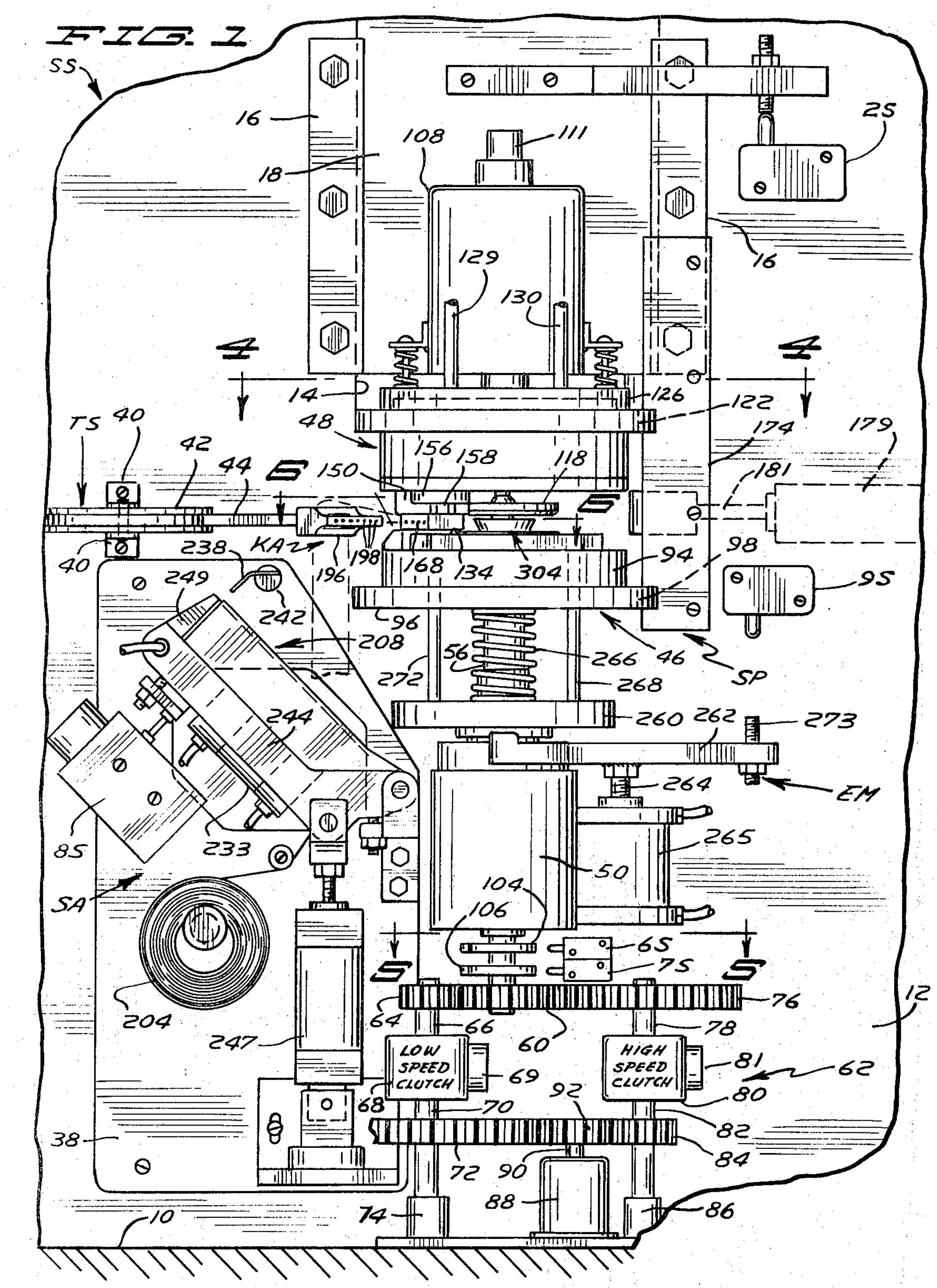
FIG. 1 is a front elevational view of the machine exemplifying the invention with the upper spindle unit lowered into its operational position with respect to the lower spindle unit in preparation for the initial winding step.

DESCRIPTION OF THE PREFERRED EMBODIMENT a. Support Structure

As best viewed in FIGS. 1 and 2, the structure SS for supporting the various assemblies and mechanisms comprising the tape winding machine hereinafter described includes a base 10 having a vertical panel 12 extending upwardly therefrom, the vertical panel having a rectangular opening 14 formed therein. As will be discerned from FIGS. 1, 2 and 3, the rectangular opening 14 is flanked by two vertically oriented guides 16 affixed to the panel 12 that constrain a plate 18 for vertical sliding movement. A bracket 20 (FIG. 3) on the slide plate 18 has a horizontal pin 22 extending therethrough so as to connect the lower end of the actuating rod 24 projecting downwardly from an air cylinder 25. The air cylinder 25 is mounted on a cross strip or horizontal platform 26 so that the slide plate 18 is movable up and down relative to the cross strip or platform 26.

Figures 2, 3:
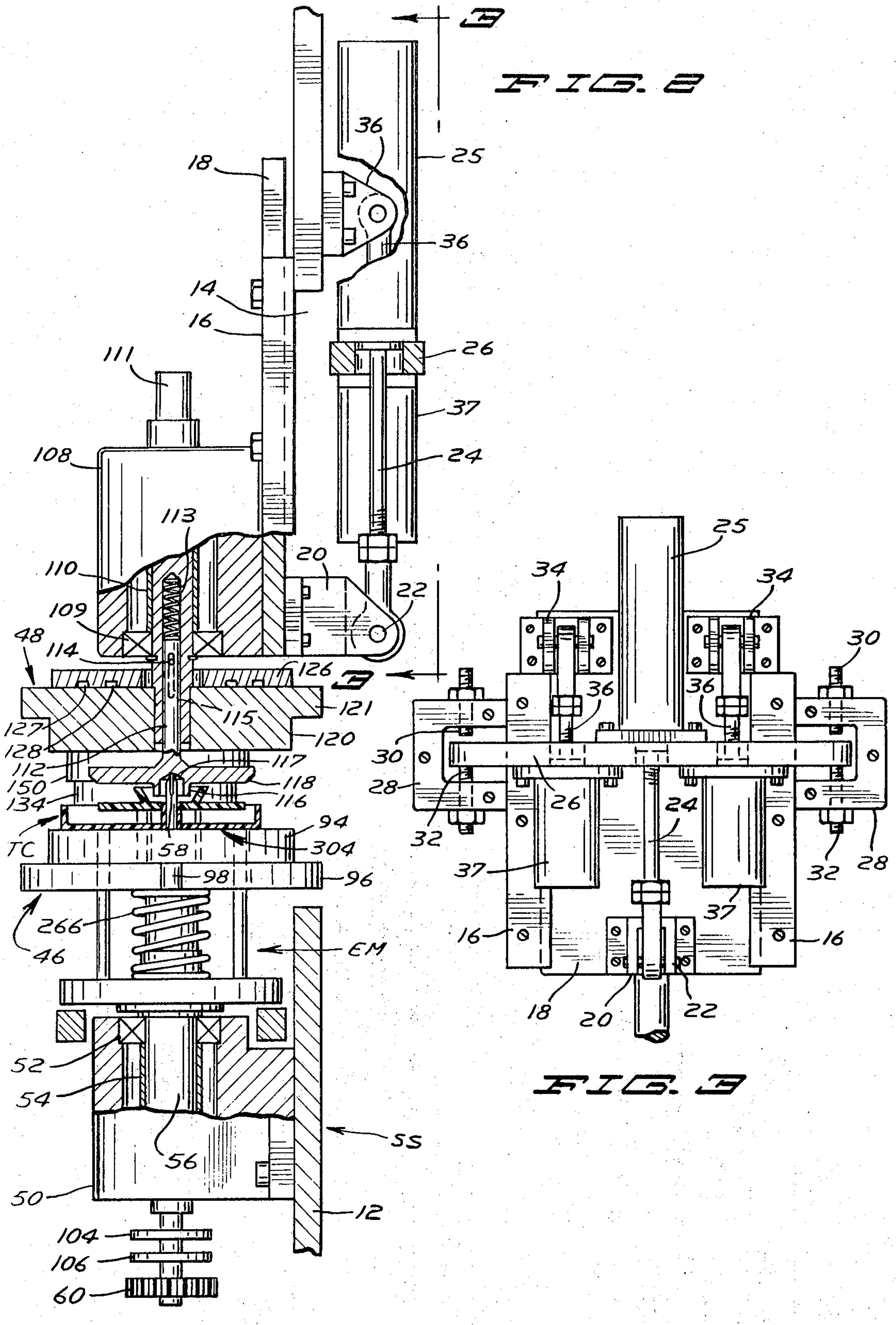
FIG. 2 is a side elevational view corresponding to FIG. 1 without the diagrammatically depicted drive mechanism removed and with certain parts illustrated in section in order to show to better advantage their specific design.
FIG. 3 is a fragmentary rear view of FIG. 1, the view being taken in the direction of line 3—3 of FIG. 2.

From FIG. 3, it will be perceived that two U-shaped brackets 28 are fixedly attached to the vertical panel 12. Each has an upper limit screw 30 and a lower limit screw 32, the upper and lower limit screws 30, 32 determining the amount of vertical movement of the cross strip or platform 26. Two additional brackets 34 are affixed to the vertical panel 12 and by means of a pair of rods 36 belonging to air cylinders 37, both of these air cylinders being fixedly attached to the underside of the cross strip or platform 26. The strip or platform 26 can thus be moved upwardly between the limit screws 30, 32. It will be appreciated that two air cylinders 37 are referred to but that they act in concert and that just one could be used if centrally disposed. An auxiliary mounting plate 38 (best seen in FIGS. 1 and 9) is also provided, being secured to panel 12, and serves to support a splicing assembly SA hereinafter described.

b. Tape Supply

The tape supply, labeled TS, includes a pair of fixedly mounted arms 40 which project from the vertical panel 12. Between the arms 40 is journaled a spool 42 containing a supply of magnetic recording tape 44 thereon. A suitable guide or roller 45 (FIG. 4) deflects the tape 44 so that it is delivered to the machine in the proper direction. Both the thickness and width (height as tape is oriented) of the tape 44 is immaterial to practicing the invention. However, it will be assumed that the width is one-eighth inch in this instance and that the exemplary machine for winding tape is designed to handle this size.

c. Spindle Assembly

The spindle assembly SP, best understood from FIGS. 1 and 2, comprises a lower spindle unit 46 and an upper spindle unit 48. The lower unit 46 includes a bearing housing 50 that is fixedly secured to the vertical panel 12, the bearing housing 50 containing upper and lower bearings 52 (the upper one being visible in FIG. 2) with a sleeve or spacer 54 therebetween (also see FIG. 2). The sleeve or spacer 54 encircles a lower shaft or spindle 56 having a slotted upper end 58 (FIGS. 2, 15, 16 and 17) and a gear 60 affixed thereto at its lower smaller end.

Actually, an entirely different drive mechanism has been used in actual practice for rotating the spindle units 46, 48 (and the construction of the spindle units themselves are different from those actually used), the mechanism in actual practice including a separate gear for each of the spindle units. However, inasmuch as the drive mechanism that has been actually used is relatively difficult to pictorially portray without resort to an elaborate set of drawings, a highly diagrammatic drive mechanism designated generally by the reference numeral 62 has been superimposed on FIG. 1 only. The drive mechanism 62 includes a relatively small gear 64 in mesh with the gear 60 attached to the lower end of the spindle 56. A shaft 66 extends downwardly from the small gear 64 and enters a low speed clutch 68 operated by an integral air cylinder 69. A shaft 70 extends downwardly from the clutch 68, having a relatively large gear 72 disposed thereon, the lower end of the shaft 70 being journaled in a bottom bearing 74.

Similarly, a relatively large gear 76 is also in mesh with the gear 60 on the lower end of the spindle 56, the relatively large gear 76 having a downwardly extending shaft 78 that enters a high speed clutch 80 operated by an integral air cylinder 81. A shaft 82 extends downwardly from the high speed clutch 80 and has fixedly disposed thereon a relatively small gear 84, the lower end of the shaft 82 rotating in a bottom bearing 86.

The drive mechanism 62 further comprises an electric motor 88 having an upwardly directed shaft 90 which carries thereon a gear 92 engaged with each of the gears 72 and 84. Thus, depending on whether the low speed clutch 68 or the high speed clutch 80 is operated, the gear 60 carried at the lower end of the spindle 56 will be driven at either a relatively low speed or a relatively high speed for a reason that will become apparent as the description progresses.

The upper end of the spindle 56 has mounted thereon a disc 94 provided with a larger diameter ring or flange portion 96. It might be well to explain at this time that the periphery of the disc 94 can be hobbed to provide gear teeth by which the spindle unit 46 can be driven, this having been done in actual practice. However, it has already been pointed out that the drawings would be rendered unduly complex if such drive arrangement were to be depicted. From FIGS. 2, 15, 16 and 17 it will be discerned that the disc 94, more specifically its flange portion 96, has an alignment notch 98 for assuring that it will always start and stop its rotative travel at the same angular position. The need for this will be more fully appreciated as the description progresses. A segmental guide 100 is secured to the upper face of the disc 94 in an area diametrically opposite the notch 98, the guide 100 allowing the lower edge of the supply tape 44 to ride thereover.

As can be most readily seen from FIG. 15 the disc 94 has a trio of upstanding fixed lugs 102*a*, 102*b*, 102*c* for positioning the tape cartridge casing which will be hereinafter described. The lugs 102 are narrower at their upper ends, thereby providing tips 103*a*, 103*b* and 103*c*. The tip 103*a* is somewhat longer than the tips 103*b* and 103*c* and extends upwardly through the flange of the reel (FIGS. 16 and 17). A first cam plate 104 is carried on the shaft 56, having a cam 105 (FIG. 5) projecting radially therefrom so as to actuate a switch 6S to cause the air cylinder 37 (through the agency of electrical controls described in conjunction with FIGS. 18A and 18B) to raise the upper spindle unit 48, the screws 30 (FIG. 3) limiting this upper movement to a distance slightly greater than the height (width) of the tape 44. A second cam plate 106 has a cam 107 projecting therefrom which rotatively trails the cam 105, the cam 107 serving to activate a switch 7S which causes an accelerated rotation of the spindle units 46 and 48 via the high speed clutch 80 (FIG. 1), all as will hereinafter become manifest later on, especially when considering the detailed operation of the machine. However, it will be briefly mentioned at this time that the swing arm assembly (FIG. 5) has been generally denoted by the reference numeral 95 and includes a pivotal arm 97 that is connected to the piston rod 99 of an air cylinder 101. The switches 6S and 7S, being mounted on the arm 97, can be swung toward (as shown) or away from the cams 105 and 107.

The upper spindle unit 48 includes a bearing housing 108 affixed to the slide plate 18 that is constrained for vertical movement by the vertical guides 16. The housing 108 contains two bearings 109 with a sleeve or spacer 110 therebetween. The bearings 109 encircle a shaft or spindle 111 which is quilled or hollow at its lower end of the accommodation of a reciprocal rod 112, a coil spring 113 (FIG. 12) yieldingly urging said rod downwardly. The rod 112 has a transverse pin 114 extending diametrically therethrough, its oppositely projecting ends being received in slots 115 and one of which slots appears in phantom outline in FIG. 2. In this way the rod 112 can move vertically through a distance determined by the length of the slots 115 but is literally keyed to the shaft 111 as far as rotation is concerned, being used to transmit rotative effort to said shaft 111. In this regard the rod 112 has a socket 116 at its lower end with a diametrically disposed web 117 extending thereacross, the web 117 being of a thickness so as to be engaged with the slot 58 at the upper end of the spindle 56 belonging to the lower spindle unit 46. It will be understood that the slot 58 and web 117 collectively function as a coupling for the two spindle units 46, 48. As already mentioned, in actual practice, a separate gear is used to rotate the upper and lower spindle units and the drive mechanism 62 diagrammatically depicted in FIG. 1 does not represent the actual mechanism that has been found so satisfactory. The rod 112 is formed with an integral flat wafer-like head 118 at its lower end, the lower face of which head 118 functions as a guide for the upper edge of the tape 44. Once again, it will be emphasized that both the lower and upper spindle units 46, 48 are driven differently from the arrangement diagrammatically portrayed in FIG. 1.

A disc 120 generally similar to the disc 94 described hereinbefore has an integral flange portion 121. As with the disc 94, the disc 120 also has a peripherally located alignment notch, the notch being identified by the numeral 122 and appearing in FIG. 4, although it is shown in dotted outline in FIG. 1, as is its companion notch 98 in the flange portion 96 of the disc 94.

Figures 4, 5, 6:
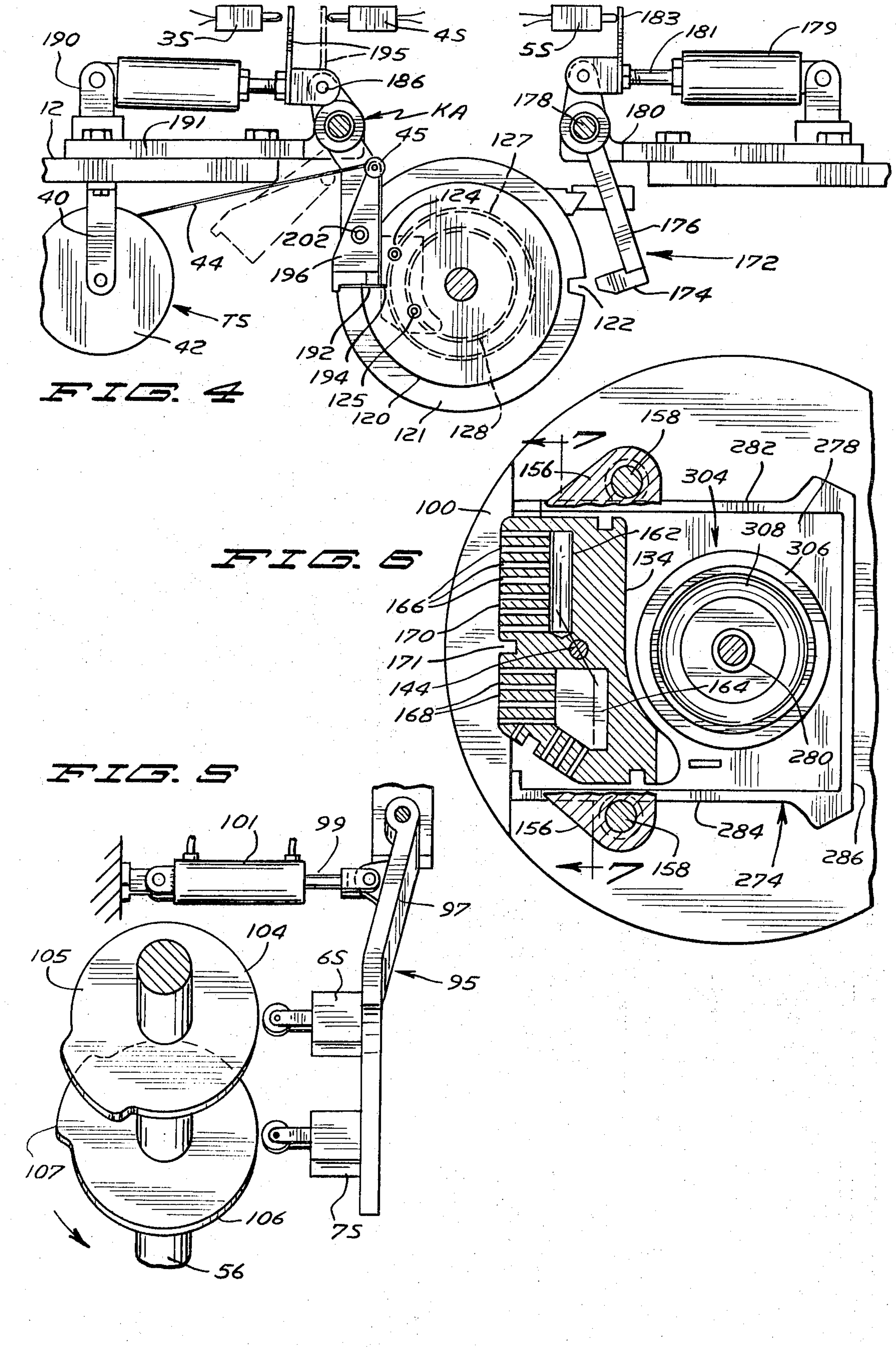
FIG. 4 is a sectional view taken in the direction of line 4—4 of FIG. 1 for the purpose of showing more clearly the construction of the knife assembly and the latch mechanism, the pawl bar of the latter being retracted to permit rotation of the spindle units.
FIG. 5 is a perspective detail of a pair of cams and switches that become effective during the rotation of the spindle units, the view taken generally in the direction of line 5—5 of FIG. 1.
FIG. 6 is a sectional view taken in the direction of line 6-6 of FIG. 1 for the purpose of illustrating the internal construction of the vacuum shoe carried by the upper spindle unit.
Figures 7, 15, 16, 17:
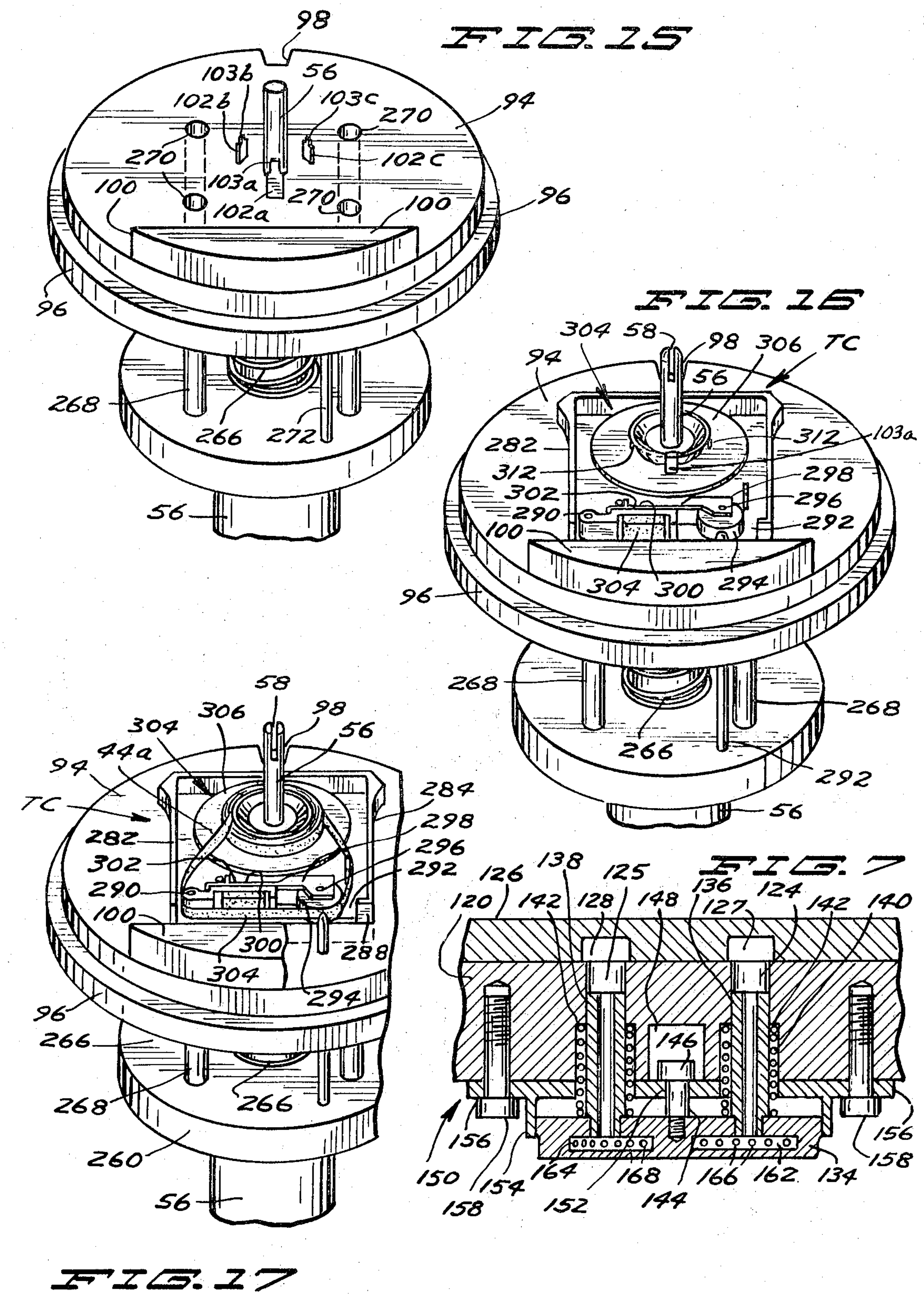
FIG. 7 is a sectional view taken in the direction of line 7—7 of FIG. 6 for the purpose of depicting how the vacuum shoe is mounted.
FIG. 15 is a perspective view of the upper portion of the lower spindle unit before an empty tape cartridge has been placed thereon.
FIG. 16 is a perspective view like FIG. 15 but with an empty cartridge placed thereon, the position of the casing and the slightly elevated reel corresponding to the relationship depicted in FIG. 1.
FIG. 17 is a view resembling FIG. 16 but picturing the cartridge with the fully wound and spliced tape thereon and with the ejection mechanism having moved upwardly to the extent that the tapered pin is performing its deflecting action but just prior to the raising of the cartridge casing by the thrust pins which are at this stage beginning to engage the underside of said casing, and FIGS. 18A and 18B when placed one above the other collectively comprise FIG. 18 which represents an electrical schematic diagram illustrating certain of the switches, relays and solenoids utilized in performing the various automatic functions.

From FIGS. 4 and 7 it will be discerned that two vacuum passages 124, 125 extend downwardly through the disc 120 for a purpose presently to be explained. Overlying the disc 120 is a stationary vacuum manifold ring 126 having downwardly facing annular groove 127, 128 (FIGS. 2 and 7). The annular grooves 127, 128 are connected via tubes 129, 130 (FIG. 1) to a vacuum source (not shown). By means of a solenoid actuated valve IV (FIG. 18) the tube 129 leading to the annular groove 127, which is in turn in communication with the tubular passage 124, can be connected to the vacuum source and similarly the vacuum passage 125 in communication with the other annular groove 128 can be connected when appropriate, as will be subsequently explained.

Having mentioned the vacuum manifold ring 126 and the two vertical passages 124, 125 leading downwardly through the disc 120 of the upper spindle unit 48, it will now be observed from FIG. 7 that the two passages provide communication to a vacuum shoe 134. The vacuum shoe 134 has a pair of upwardly directed tubes 136, 138 (FIGS. 4 and 7) that slidably fit within the two passages 124, 125 extending through the disc 120. It is via these tubes that air is withdrawn from the shoe 134 as will become clear shortly. From FIG. 7 it will be discerned that each tube 136 and 138 has a coil spring 140 encircling it, the upper end in each instance bearing against an internal shoulder 142, whereas the lower bears against the upper surface of the shoe 134. A stud or bolt 144 has its head 146 movable within a recess 148 formed in the disc 120. In this way, the coil springs 140 resiliently urge the shoe 134 downwardly but the head 146 limits this downward movement. More specifically, the underside of the head 146 abuts the top surface of a housing 150, the shank of the bolt extends downwardly through hole 152 (FIG. 7) and the lower end of the bolt is threaded into the shoe 134. The housing 150 has a downwardly directed peripheral skirt 154 which permits the vacuum shoe 134 to move vertically therein, the housing 150 having integral, oppositely issuing ears 156 and a pair of bolts 158 securing the housing 150 to the underside of the disc 120. It will be understood that the vacuum shoe 134 is biased downwardly by the springs 140 and projects beneath the lower edge of the skirt 154 a distance approximating the height (width) of the tape 44.

Figures 13, 14:
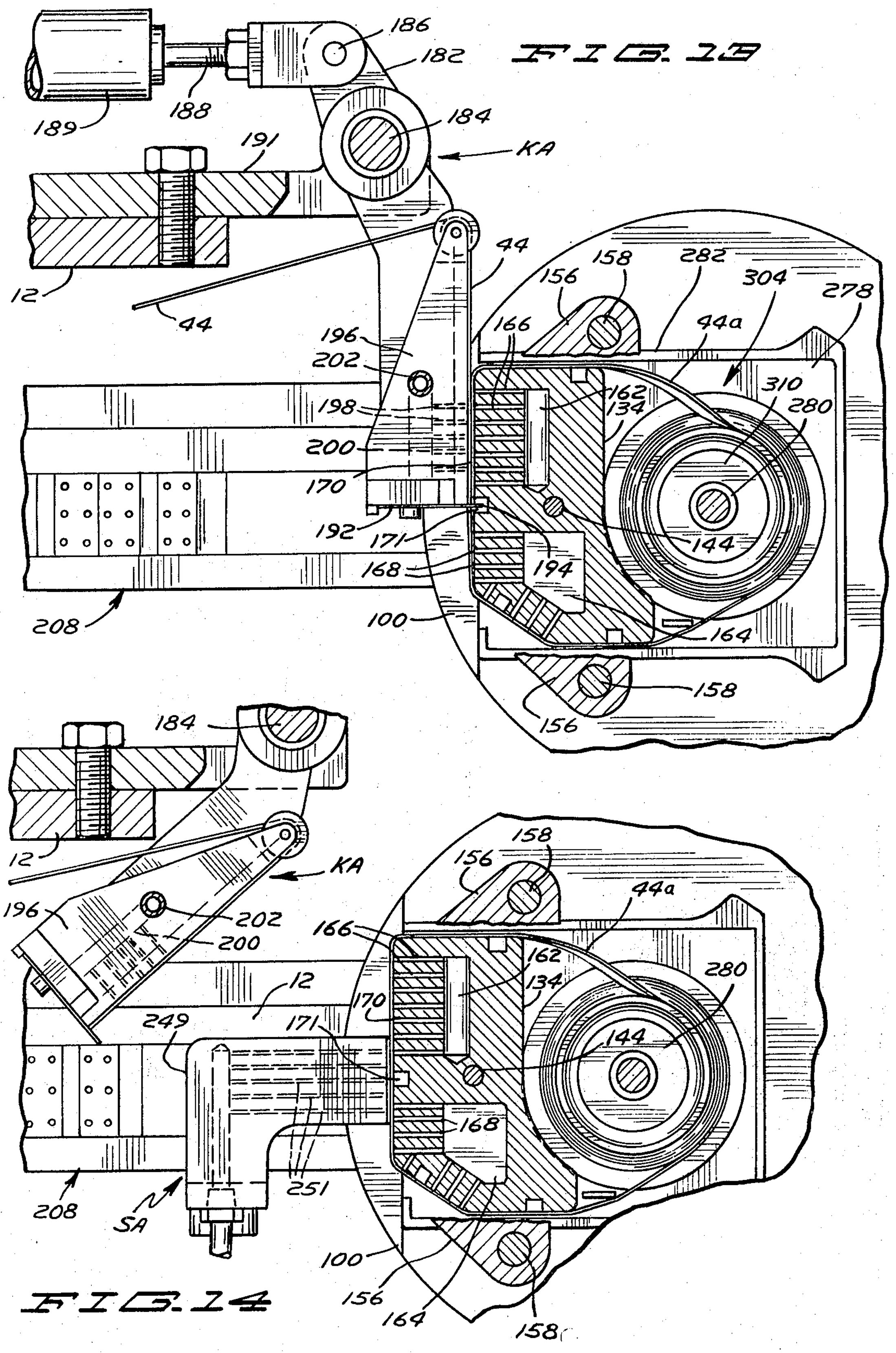
FIG. 13 is a sectional view showing the knife assembly cutting the tape after the winding portion of the cycle has been completed, the view being in the same plane as FIG. 6.
FIG. 14 is a view corresponding generally to FIG. 13 but with the knife assembly retracted and the splicer assembly swung inwardly to apply a severed section of splicing tape.
Figure 10A:
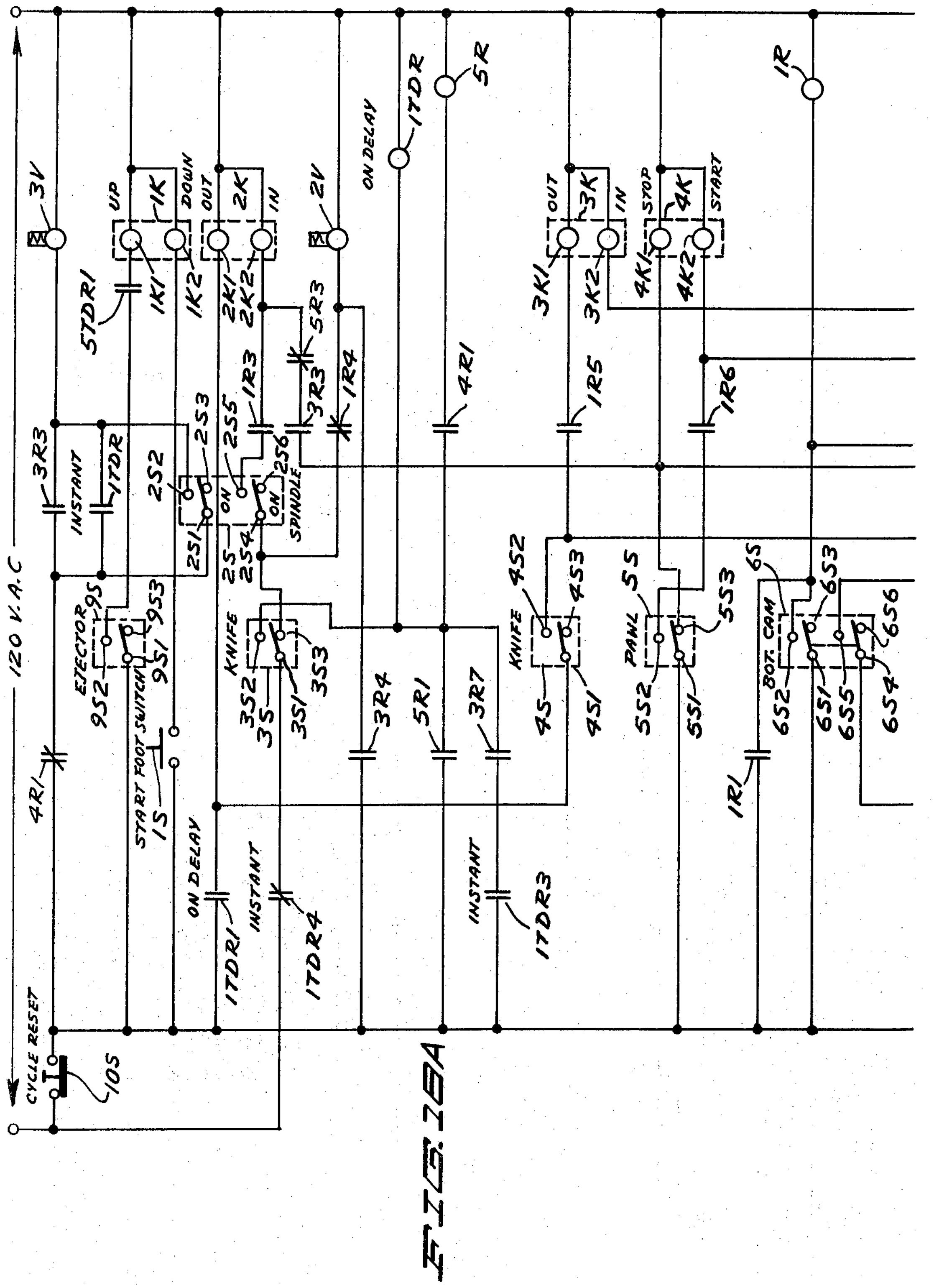
Figure 10B:
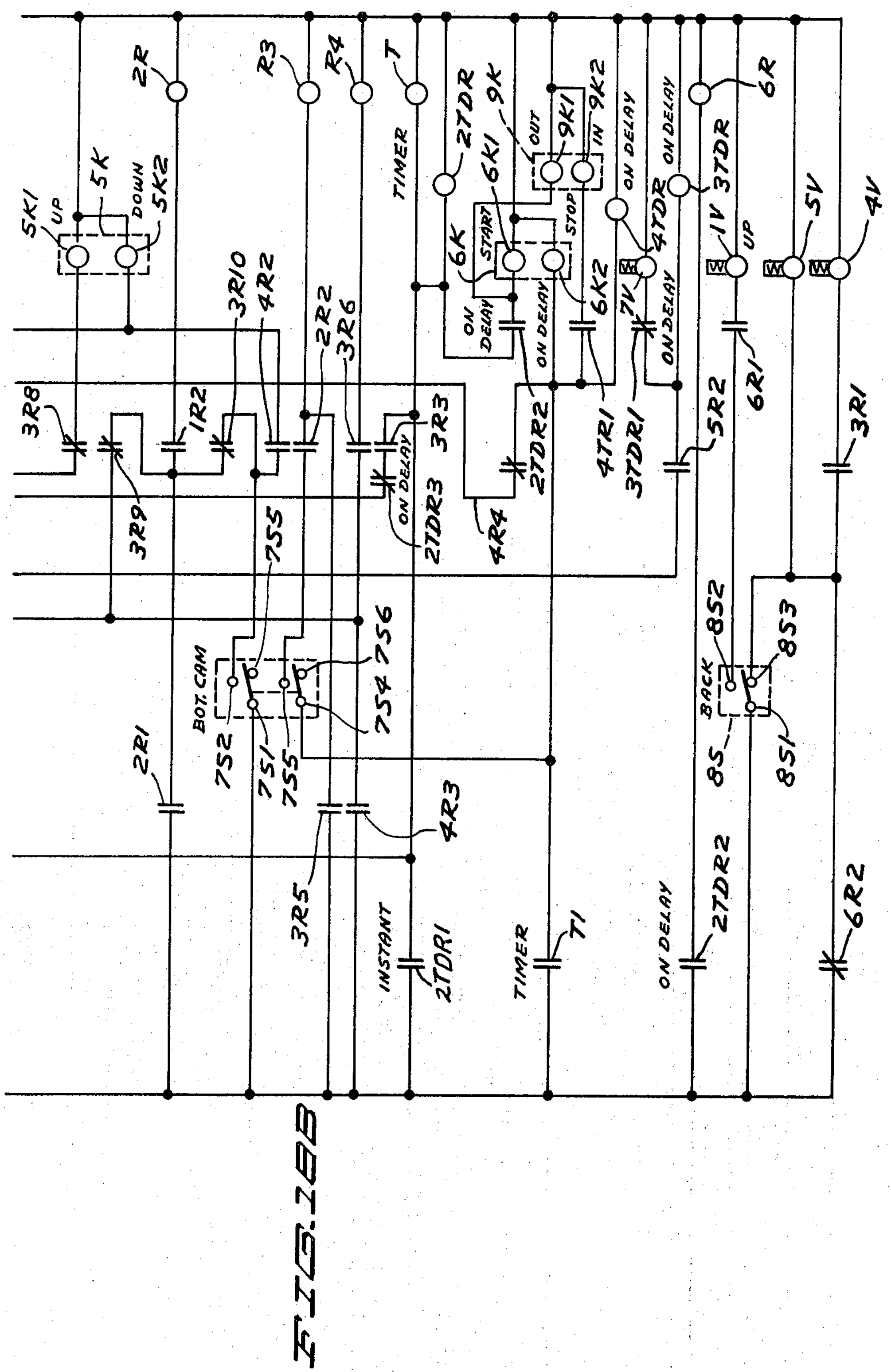

It will be seen from FIGS. 6, 13 and 14 that the vacuum shoe 134 contains two chambers 162, 164, the two tubes 136, 138 connecting with the two chambers 162, 164 so that vacuum can be selectively applied to each of the chambers. Still further, two sets of vacuum ports 166, 168 extend horizontally outwardly to a vertical surface 170 that is utilized in confronting the tape 44 to be wound. Consequently, it will be appreciated that the two sets of ports 166, 168, when vacuum is applied thereto, releasably retain or hold any overlying section of magnetic tape 44 against the surface 170. The shoe 134 has a small notch at 171, the purpose of which will be presently explained.

Vacuum action (via the ports 166) holds the tape 44 during the rotative period, it can be pointed out at this stage. However, it will be understood that a mechanical clamping machanism (not shown) can assist in the retention of the tape, especially with respect to the set of ports 166 that is initially used for holding the free or leading end of the tape 44 to be wound. Stated somewhat differently, the adequate retention of the tape 44 can be achieved easily with vacuum, but when a relatively high degree of vacuum is employed, then there is a correspondingly large amount of friction developed between the underside of the stationary vacuum manifold ring 126 and the upper side of the disc 120 which rotates quite rapidly during the accelerated portion of the winding period. Actually, a third annular groove (not shown) is located intermediate the grooves 127, 128 so that air under pressure will substantially neutralize the action of the vacuum. For this reason a mechanical clamp is desirable, and which has been employed in practice, to reduce the amount of vacuum that must be applied for assuring retention of the leading tape end during the rotative period, particularly when making rapid starts as is preferably in order to complete as many winding cycles as possible in a given period of time.

Closely associated with the spindle assembly, and actually being considered a part thereof, is a latch mechanism 172 comprised of a pawl bar 174 carried at the free ends of two pivotally mounted arms 176, the arms being pivotal about upper and lower pins 178 held in brackets or clevises 180 fastened on the vertical panel 12.

Employed in conjunction with the latch mechanism 172 is a switch 5S that signifies when the pawl bar 174 has been retracted so as to release the two spindle units 46, 48 for rotation. More precisely, the switch 5S initiates rotation of the spindle units 46, 48 by causing engagement of the low speed clutch 68 through energization of the solenoid valve 4K.

d. Knife Assembly

The knife assembly KA includes a rocker arm 182 mounted intermediate its ends on a vertical pin 184 supported by the vertical panel 12. The rocker arm 182 has a pin 186 at one end which connects with a rod 188 extending from an air cylinder 189, the air cylinder 189 being supported by a clevis 190 (FIG. 4) on a small bracket 191 attached to the vertical panel 12. The arm 182 carries a thin blade or knife 192 providing a sharp edge at 194 which enters the notch 171 on the shoe 134 (FIG. 13), the knife 192 being fixedly attached to the end of the rocker arm opposite the pin 186. As can be seen from FIGS. 4 (and FIG. 13) the solid line position of the rocker arm 182 depicts the arm 182 after it has been actuated into its tape cutting position. The phantom line position in FIG. 4 (and the solid line position in FIG. 14) represent the rocker arm 182 in its retracted or home position. An extension 195 serves to operate a switch 3S when the knife 192 moves into its tape-cutting position, and this same extension functions to actuate a switch 4S when the knife 192 is retracted.

While the prime function of the knife assembly KA is to cut the tape 44 at the proper time, it performs another function now to be described. This secondary function is to retract or withdraw the new leading tape end that is formed by the severing action, this being the end that remains integral with the magnetic tape 44 on the supply spool 42. To do this, the arm 182 has mounted thereon a vacuum shoe 196 with several vacuum ports 198 (shown in dotted outline in FIGS. 13 and 14) that have vacuum selectively applied thereto, via a chamber 200 (also shown in dotted outline in FIGS. 13 and 14) within the vacuum shoe 196 and the chamber 200 in turn is connected by means of a tube 202 (FIGS. 4, 13 and 14) to the electrically operated valve IV which, when open, provides communication to the vacuum source, which as already indicted, has not been illustrated. Not only does the vacuum shoe 196 on the knife assembly KA retract or withdraw the severed leading tape end, but it holds such end in readiness for the succeeding winding cycle, the arm 182 then moving inwardly once again to transfer the new leading tape end to the vacuum shoe 134, more precisely the surface 170 thereof, carried on the upper spindle unit 48.

There are two switches 3S, 4S, as pointed out above, actuated by the rocker arm 182. More specifically, the switch 3S is instrumental in shutting off the vacuum to transfer the leading end of the supply tape 44 when the knife assembly KA has moved all the way inwardly toward the vacuum shoe 134 and also signals the relay 2K (FIG. 18) that it should retreat the knife 192 after its edge 194 has performed its cut for that cycle. When the rocker arm 182 is fully retracted, that is in its home position, it activates the switch 4S which is connected to the relay 3K electrically associated with the latch mechanism 172. Thus, the full retraction of the knife assembly KA signifies to the latch mechanism 172 and provides the requisite control to cause it to be disengaged from the disc notches 98, 122 so that the spindle assembly may be rotated.

e. Splicer Assembly

The splicer assembly SA, best seen in FIGS. 8–12, is mounted on the auxiliary plate 38 that is attached to the vertical panel 12. As its name implies, it splices the magnetic tape 44 after it has been cut by the vertically oriented knife edge 194 on the knife 192. Accordingly, a supply of splicing tape 204 is supported on a shoulder screw 206 so that tape can be incrementally withdrawn therefrom. As is customary with splicing tape, it has a pressure sensitive adhesive surface on one side which sticks to the severed ends of the magnetic tape 44 to hold them together.

To advance the splicing tape 204, a shuttle mechanism 208 (FIGS. 10 and 11) is employed. The shuttle mechanism 208 comprises an arm 210 pivotally carried on a horizontal pin 212 that projects from the auxiliary plate 38. On the arm 210 is a shuttle body 214 that is fixedly attached to the arm 210, the shuttle body 214 having three vacuum shoe portions or faces 216*a*, 216*b* and 216*c* and each face containing a number of vacuum ports 218 connected together by means of an internal chamber (not visible). The chamber in turn is connected via a flexible tube or hose 222 to an electrical valve 2V that is connected to the vacuum source means 132. The shuttle mechanism 208 further includes an advance shoe or shuttle slide 224 having three vacuum shoe portions or faces 226*a*, 226*b* and 226*c*, each having a plurality of vacuum ports 228 therein. As with the shoe portions or faces 216*a*, 216*b* and 216*c*, these portions or faces are collectively connected to the source of vacuum 132 through an electrically operated vacuum valve 3V. There is a lateral extension or lug 230 on the shuttle slide 224 which mechanically connects with the rod 232 of an air cylinder 233. When the rod 232 is moved outwardly to actuate the shuttle slide 224 in the direction of the left end of the arrow 234, it causes a portion of the splicing tape to be advanced relative to the shuttle body 214; the vacuum applied to the ports 218 of the shuttle body 214 is at this time cut off to permit the advancement, the valve 2V being closed. From FIGS. 8 and 10 it will be observed that the shuttle mechanism 208 is biased in a clockwise direction by reason of an extension spring 235 connected at one end to an extension 236 on the arm 210, the other end of the coil spring being anchored to a fixed lug or cam 237 on the plate 38.

At this time, attention will be directed to a knife or blade member 238 having a knife edge 240 thereon, the knife being fixedly held by a horizontal pin 242 (more specifically to a flat portion thereof) extending outwardly from the auxiliary plate 38. It is when the shuttle mechanism 208 moves in a clockwise direction about the pin 212 to bring the advanced or projecting end of the splicing tape 204 against the knife edge 240 that a section of splicing tape is severed. It may be of assistance to recognize that the splicing tape has a width of approximately three-fourths inch and that the extended or advanced portion is approximately one-eighth inch, the one-eighth inch dimension corresponding to the width of the magnetic tape to be spliced. By providing the slide 224 with a one-eighth inch stroke, the tape 204 is advanced this same amount.

Figures 8, 9, 10, 11, 12:
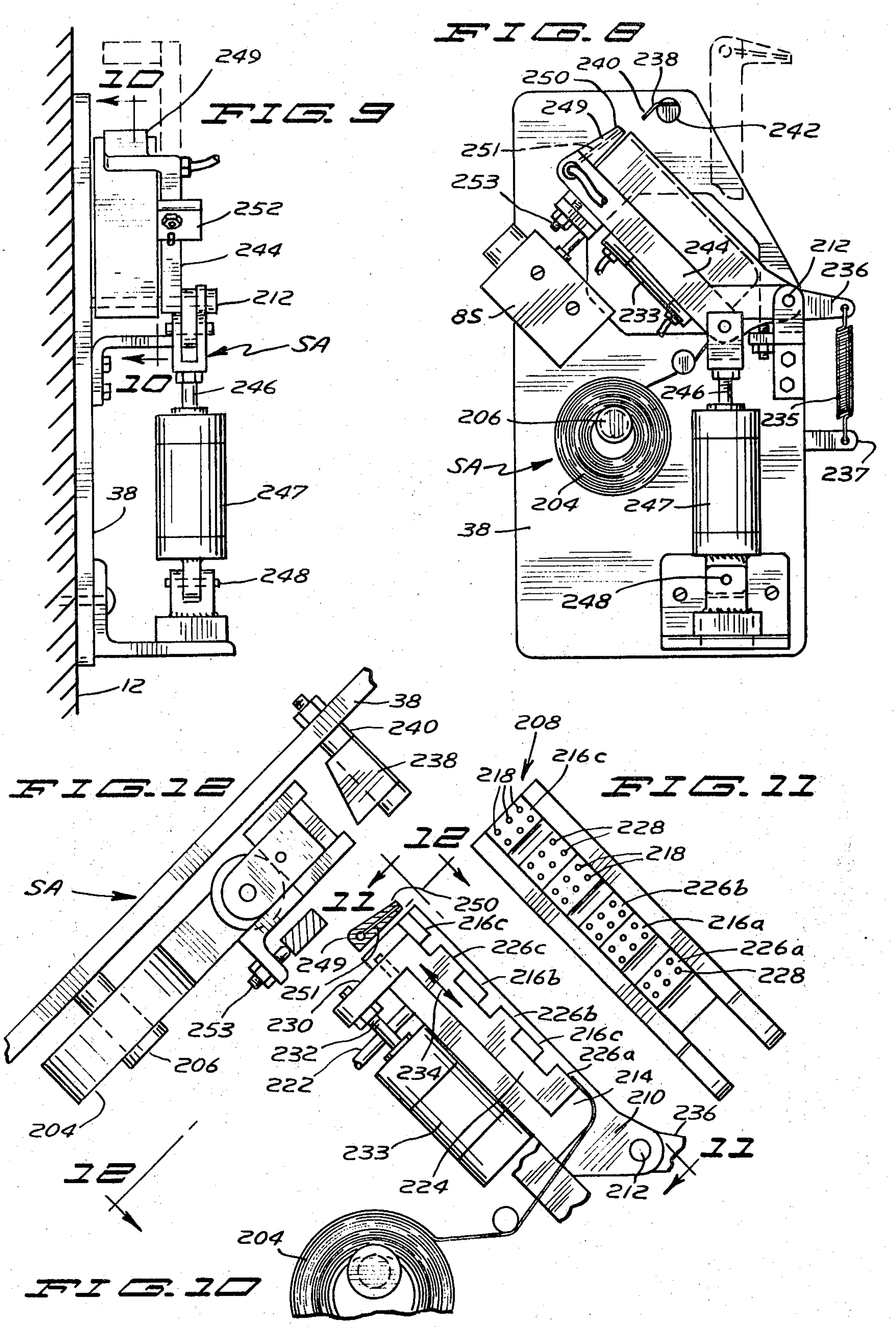
FIG. 8 is a side elevational view of the splicer assembly, the view illustrating this assembly in the same retracted position in which it appears in FIG. 1.
FIG. 9 is a side elevational view as seen from the left when viewing FIG. 8.
FIG. 10 is a view taken in the direction of line 10—10 of FIG. 9 so as to illustrate to better advantage the constructional make-up of the shuttle mechanism, the details of which are hidden from view in both FIGS. 8 and 9.
FIG. 11 is an offset view taken in the direction of line 11—11 of FIG. 10 so as to depict the various vacuum holes or ports present in the shuttle mechanism, one set of ports being moved relative to the other so as to advance the splicing tape to a location where it will be severed by the fixedly disposed knife edge.
FIG. 12 is an offset view taken in the direction of line 12—12 of FIG. 10 and also constituting a top plan view of FIGS. 8 and 9, but revolved through 45°, the view including the knife blade visible in FIG. 8 that severs the section of splicing tape advanced by the shuttle mechanism.

While the splicing tape 204 is cut by the knife edge 240, a transfer action is provided so as to move the cut splicing tape through an arc from the cutting location against the severed ends of the magnetic tape 44 to be spliced. To accomplish this, a splicing tape applicator arm 244 is pivotally mounded on the same pin 212 that the shuttle mechanism 208 is pivotally mounted on. However, the arm 244 is actuated by a rod 246 associated with an air cylinder 247, the air cylinder 247 being pivotally supported at 248 on the auxiliary plate 38. The arm 244 is formed with a fowardly directed "gooseneck" portion 249 that is clearly visible in FIGS. 8 and 10. The lateral offset configuration, however, of the gooseneck portion 249 is best seen in FIG. 9, the rear of this portion 249 there being viewed. At any rate, the gooseneck portion 249 has a nozzle 250 through which several vacuum ports 251 extend. The vacuum ports 251 apply vacuum via a valve 2V (FIG. 18) to the splicing tape 204, more specifically the severed section thereof, and moves or transfers the severed section to the ends of the magnetic tape 44 that will have been cut by the knife 192 and are to be spliced together.

While the air cylinder 247 swings the splicing tape applicator arm 244 about the pin 212 (common to both the mechanism 208 and arm 244) from its retracted position to its forward or tape applying position, the shuttle mechanism 208 is pivoted by means of the spring 235, the spring 235 literally pulling the shuttle mechanism 208. By means of a laterally directed lug or ear 252 integrally mounted on the arm 210 which carries an adjustable screw 253, the latter bearing against the backside of the applicator arm 244, the shuttle mechanism 208 is constrained to follow any clockwise angular movement of the arm 244 owing to the pull or biasing action of the spring 235. By reason of the pin 242 (FIG. 8), a fixed stop is provided that limits the clockwise rotation of the arm 210. In this regard, when the air cylinder 247 forces its piston rod 246 upwardly, the applicator arm 244 is swung in a clockwise direction about the pin 212 and the spring 235 causes the arm 210 to pivot therewith since the arm 210 is mounted on the pin 212. It is after the splicing tape 204 is severed by the edge of the knife 238 that the arm 210 strikes the pin 242 and further pivotal movement of the arm 210, which is part of the shuttle mechanism 208, is arrested. However, the applicator arm 244 continues its clockwise travel with the now severed end section of the splicing tape 204 carried thereon, the vacuum applied through the ports 251 to the nozzle 250 releasably holding the detached splicing tape section so that its adhesive side is applied to the magnetic tape 44, which at this stage will have been cut by the knife 192. Hence, by way of a quick review, the splicing tape 204 is first incrementally advanced so that the end to be cut extends beyond the shuttle mechanism 208 into the path traversed by the nozzle 250 on the arm 244. The stop screw 256 limits the clockwise movement of the shuttle mechanism 208 and it is after this that the applicator arm 244 takes over, moving or transferring the severed section of splicing tape 204 against the ends of the magnetic tape 44 that are to be spliced. A switch 8S is actuated when the splicing assembly, which includes the shuttle mechanism 208 and the applicator arm 244, is retracted to its home position (see FIG. 8).

f. Ejecting Mechanism

The ejecting mechanism EM includes a plate or disc 260 which loosely encircles the lower spindle 56, being moveable upwardly by a lift yoke 262 extending laterally from a rod 264 of air cylinder 265. A coil spring 266 normally urges the disc 260 downwardly, reacting against the underside of the disc 94 in doing so.

It will be perceived that a plurality of upstanding thrust pins 268 (actually four such pins) are fixed to the disc 260, the pins 268 being movable up through four openings at 270 (see FIG. 15) in the disc 94 through which the various pins 268 can move. Specific attention is directed to a tapered pin 272 that is somewhat longer than the other pins 268 so as to deflect the pincher roller of the cartridge (not yet described). The pinch roller is thus deflected by the tapered pin 272 as the disc moves upwardly. Continued movement of the disc 260 will cause the remaining pins 268 to strike against the bottom of the cartridge casing, thereby forcing the cartridge casing upwardly, the lugs 103*a*, 103*b* and 103*c* permitting this to occur. Sufficient upward movement of the casing will cause the casing to strike the flange of the reel and thereby move the casing and reel upwardly to effect the ejecting action. It is after the cartridge and reel (with the wound tape thereon) that are ejected upwardly when the machine herein described has completed its winding function. An upstanding stud 273 on the yoke 262 actuates a switch 9S at the end of the upward travel of the ejecting mechanism EM for a purpose hereinafter described.

g. Tape Cartridge

The tape cartridge TC includes a casing 276 having a bottom wall 278 with an upwardly directed tubular post 280 thereon. Additionally, there are side walls 282, 284 and a rear wall 286. A front wall 288 extends only part way between the two side walls 282 and 284, thereby leaving a slot 290 adjacent the side wall 282 and an opening 292 through which one segment of a pinch roller 294 projects. The pinch roller 294 is journaled for rotation about a vertical axis provided by a pin 296 carried between two vertically spaced fingers 298, the fingers being integral with a flexible shank 300 having the end thereof remote from the pinch roller 294 fixedly attached to the front wall 288. The front wall 288 is recessed at 302 so as to accommodate a section of sponge rubber 304 across which the endless tape array denoted 44a (after cutting and splicing) passes and which assists in urging the tape against the tape head of the tape recorder.

The reel on which the tape 44 is wound to provide the tape array **44*a* has been indicated generally by the reference numeral 304. The reel 304 comprises a flange 306 and hub 308 projecting upwardly from the flange. Centrally disposed in the flange 306 is a hole 310 of a size so as to fit over the upstanding tubular post 280, the post 280 thus serving as a bearing about which the reel 304 rotates. The flange 306 has formed therein three slots 312 having the same spacing or locations as the lugs 102*a*, 102*b* and 102*c* and through which the tips 103*a*, 103*b* and 103*c* extend. Although not visible, the bottom wall 278 of the casing 276 is formed with similarly oriented, but longer, slots. In this way, the lugs 102*a*, 102*b* and 102*c* project upwardly through the bottom wall 278 and the tips 103*a*, 103*b* and 103*c* into the slots 312, the tip 103*a* being sufficiently long so as to project above the flange 306 thereby preventing the tape 44 from being wound so tightly on the hub 308** that the ejection step cannot be readily performed. Of course, other casing and reel designs can be accommodated, the slotted embodiment mentioned above being only illustrative.

h. General Operation

Before presenting a detailed operation, it is believed helpful to outline the general operation that takes place when practicing the invention. Accordingly, the following broad sequence of steps occurs:

1. The operator manually loads the tape cartridge casing 276 and the tape reel 304 onto the lower spindle unit 46.

2. The upper spindle unit 48 is brought down into winding position.

3. The knife arm 182 moves in and transfers the leading tape end held thereon to the upper spindle unit 48.

4. After retraction of the knife arm and release of the two spindle units 46, 48, these units start rotating together, and after approximately three-fourths of one turn the upper spindle unit 48 is elevated a distance equal to the width of the tape 44.

5. The correct length of tape is wound on the reel 304 by a timing action.

6. The upper spindle unit 48 drops back to its lower position, doing so when in a non-interfering rotational relation with the tape 44, and then winds tape 44 over the vacuum shoe 146 during the last one-half turn.

7. The knife arm 182 moves in and the knife edge 194 cuts the tape 44, the knife 192 then moves back while holding the end of the tape that has been severed from the tape supply.

8. The two abutting ends of the magnetic tape that has been wound are spliced together with splicing tape 204.

9. The vacuum is shut off from the vacuum shoe 146, thereby releasing the tape 44 in the region of the splice.

10. The cartridge casing 276 is pushed upwardly by the ejector pins 268 forcing the vacuum shoe 134 upwardly into the housing 150 mounted to the underside of the disc 120 of the upper spindle unit 48, and the tape slips into position within the cartridge casing.

11. The upper spindle unit 48 returns to its raised loading position (not illustrated).

12. The operator removes the wound cartridge 274 from the machine, and the machine is ready for the succeeding winding cycle.

i. Detailed Operation

Having presented the foregoing general operational sequence, the detailed operation should be more readily understood. It will be of benefit to refer at times to the schematic diagram set forth in FIG. 18 (actually FIGS. 18A and 18B). These two FIGS. 18A and 18B comprising FIG. 18 have not up to this point been described, because any description pertaining thereto is rendered more succinct and better understood when given in conjunction with the ensuing detailed operational sequence. Although familiar is believed that a person familier with the art will be able to understand the schematic diagram set forth in FIG. 18 without a specific explanation thereof, the description to be presented will be as abbreviated as possible and with this in mind a method has been adopted for designating the various components schematically portrayed in said FIG. 18. Several illustrations or examples should suffice:

1. Relays have been designated by the letter R and each relay is denoted by a numerical prefix and its contacts with numerical suffixes. Hence, relay 1R, which has six sets of contacts, has these contacts denoted as 1R1, 1R2, 1R3, 1R4, 1R5 and 1R6. It is believed readily apparent that contacts 1R1 and 1R2 are normally open, whereas contacts 1R3, 1R4, 1R5 and 1R6 are normally closed.

2. Similarly, there are a number of switches which are labeled S, each switch being denoted by a numerical prefix and its various terminals or contacts by numerical suffixes. For example, switch 3S has a common terminal 3S1 and switching terminals 3S2 and 3S3.

3. By the same token, the letter K indicates a double solenoid, momentary contact, 4-way valve unit with a numerical prefix distinguishing the various valves that are employed, and inasmuch as there are two solenoids associated with each unit each requires differentiation. Therefore, the first solenoid valve unit is labeled 1K and the individual solenoids embodied in such a valve unit are designated as 1K1 and 1K2. Thus, solenoid 1K1 is responsible for moving the valve in one direction and 1K2 in the opposite direction.

4. Where the valve is a simple solenoid operated valve, then the letter V appears. For instance, 1V and 2V are examples, which incidentally have already been alluded to, of such electrically operated valves.

Having given the above explanation, the detailed sequential operation will now be presented. After manually loading the tape cartridge casing 276 and the tape reel 304 onto the lower spindle unit 46, this being done by first placing the casing 276 so that the several slots (not visible in the drawings) formed in the bottom 278 thereof allow the lugs 102*a*, 102*b* and 102*c* to project upwardly therethrough. The reel 304 is similarly placed, but is maintained in an elevated relationship with the bottom of the casing by reason of the smaller sized tips 103*a*, 103*b* and 103*c* on the lugs 102, the reel 304 resting on the shoulders formed by virtue of the reduced size of said tips 103. Although not illustrated in the drawings, the air cylinder 25 has retracted or pulled upwardly its piston rod 24 with the consequence that the slidable plate 18 is raised substantially (virtually the entire length of the rod 24 that is visible in FIGS. 2 and 3) which elevates the upper spindle unit 48 to such an extent that access is readily had to the upper side of the disc 94 of the lower unit 46. Stated somewhat differently, the upperside of the disc 94 is exposed to the extent shown in FIG. 15 to permit the aforesaid loading step to be performed without interference from the upper unit 48.

The upper spindle unit 48 is moved down into its winding position after completion of the above described loading by actuating the foot switch IS (FIG. 18). From the diagram (FIG. 18), it will be perceived that this action establishes an electrical path through the solenoid 1K2 which is responsible for supplying air to the upper end of the air cylinder 25 with the result that the rod 24 is forced downwardly, together with the plate 18 connected thereto. The upper spindle unit 48, it will be recalled, is mounted on the slide plate 18 which is movable from its appreciably elevated position for loading downwardly to a much lower position for winding as pictured in FIGS. 1 and 2.

When the upper spindle unit 48 moves into its winding position, the switch 2S (FIGS. 1 and 18) is actuated, which is a double pole double throw switch having terminals 2S1, 2S2, 2S3, 2S4, 2S5 and 2S6 (FIG. 18). The pole element connected to the common terminal 2S1 is in this way cammed upwardly so that an electrical path is established between the terminals 2S1 and 2S2. More specifically, the path through 2S1 and 2S2 energizes an electrically operated valve 3V which when open supplies vacuum to the vacuum ports 228 located on the three vacuum shoe portions 226*a*, 226*b* and 226*c* of the shuttle slide or advance shoe 224, it being recognized that the shuttle slide is a part of the shuttle mechanism 208 which in turn is part of the splicer assembly as clearly depicted in FIGS. 8 – 12. Since the switch 2S is a two pole switch, its other pole element is concomitantly shifted so as to establish an electrical path between its common terminal 2S4 and terminal 2S5 which completes a circuit through the solenoid 2K2 of the double solenoid, 4-way valve unit 2K. Inasmuch as the knife assembly is in its home or retracted position, the switch 3S by way of its terminals 3S1 and 3S3 provides electrical connection through the terminals 2S4 and 2S5 of switch 2S to supply power to solenoid 2K2 and the air cylinder 189 which actuates the arm 182. This swings the knife assembly inwardly toward the spindle assembly SP, more specifically toward the surface 170 on the vacuum shoe 134 of the upper spindle unit 48 which is at this time in the path of the knife 192 carried by the arm 182 of the knife assembly. This causes the knife edge 194 to cut the tape 44, the edge 154 then entering the notch 171, as seen in FIG. 13. Close inspection of FIG. 13 will show two layers of tape 44 that now have their ends adjacent the knife 192 of one side (the side toward the top of the sheet) and one layer of tape having its end toward the other side of the knife (the side toward the bottom of the sheet).

When the inward travel of the knife assembly KA is completed, the switch 3S is engaged to bridge the terminals 3S1, 3S2 so that an electrical path is made through a time delay relay 1TDR provided with normally open contacts 1TDR1, 1TDR2, 1TDR3 and normally closed contacts 1TDR4. By reason of its normally open contacts 1TDR1 (on delay) closing, the solenoid 2K1 of the unit 2K is energized so as to retract the knife assembly by supplying air to the other end of the air cylinder 189 so that the arm 182 is moved from the position depicted in FIG. 13 to the position illustrated in FIG. 14; however, this is not done until after a predetermined time has elapsed because of the time delay feature incorporated in the relay 1TDR. The second set of contacts 1TDR2 (instant), this set being normally open also, close immediately so as to continue the supply of vacuum via the electric valve 3V to the shuttle slide 234. It should be understood that valve 2V at this time is open to the chamber 200 of the vacuum shoe 196 so as to apply vacuum through the ports 198 to the leading end of the tape 44. This action retains the tape end in place so as to be movable with knife assembly KA as it swings inwardly. At the same time vacuum is applied to the chamber 162 through the valve 5V, the chamber 162 having communication through the ports 166 to the surface 170. In this way the vacuum shoe 134 is conditioned or prepared for the acceptance and retention of the leading end of the tape 44. The leading tape end is transferred from the vacuum shoe 196 of the knife assembly KA to the vacuum shoe 134 when the solenoid operated valve 2V closes which it will do when the circuit between the terminals 3S1, 3S3 is broken, which occurs when the switch 3S is actuated by the inwardly moving knife assembly.

A switch 4S, (FIGS. 4 and 18) closes, that is its terminals 4S1 and 4S2 are electrically connected, when the knife assembly has moved back to its home position and this results in the energization of the solenoid 3K1 belonging to the 4-way valve unit 3K. Energization of the solenoid 3K1 causes the pawl bar 174 to be retracted, the air cylinder 179 (FIG. 4) receiving air under pressure through the valve unit 3K into its right end to cause its piston rod 181 to be thrust to the left and thus cause the pawl bar 174 to assume the position illustrated in FIG. 4, thereby permitting the spindle assembly composed of the units 46, 48 to be rotated inasmuch as each of the spindle units 46, 48 has a notch 98, 122, respectively, which has been engaged by the pawl bar 174 up to this point. Also, energization of solenoid 3K1 causes the advance shoe 224 of the shuttle mechanism 208, which is part of the splicer assembly SA as depicted in FIGS. 8 – 12 to advance, the air cylinder 233 being connected in parallel with air cylinder 179. Thus, the splicing tape 204, which is being held against the advance shoe 224 by vacuum supplied through valve 3V,will also advance.

When the pawl bar 174 has been fully retracted from its engagement with the two spindle units 46, 48, the extension 183 (FIG. 4) on the piston rod 181 operates the switch 5S, actually shifting its pole element from the position in which it appears in FIG. 18 so that it connects terminals 5S1, 5S2 together and the solenoid 4K2 of the valve unit 4K becomes energized which causes the air cylinder 69 to effect engagement of the slow speed clutch 68 (FIG. 1). The motor 88, through the clutch 68, then rotates both of the spindle units 46, 48 at a relatively low speed since they are coupled together by the slot 58 formed at the upper end of the shaft 56 and web 117 formed on the rod 112, which is rotatively keyed to the shaft 111 (FIG. 2).

By reason of the cam 105 (FIG. 5) on the cam plate 104 of the lower spindle unit 46, sufficient rotation (about 3/4 of a turn) of this unit will close a switch 6S having terminals 6S1, 6S2, 6S3, 6S4, 6S5 and 6S6 thereon. It will be recognized that the leading end of the tape 44 is held by vacuum against the shoe 134, more specifically that section of the surface 170 served by the ports 166. The briding of the terminals 6S1 and 6S2 is responsible for causing relay 1R to be energized and also supplies power to solenoid 5K1 which results in the raising of the upper spindle unit 48; more specifically, the horizontal platform 26 (FIG. 3) is elevated due to air being supplied to the lower ends of the air cylinders 37 so that the platform 26 engages the upper limit screws 30 rather than the lower screws 32 and the leading end of the tape supply 44 is thus raised axially a distance equal to the width (height) thereof so that additional tape 44 is not wound over the leading end of the tape which at this time is being held against the vacuum shoe 134 by vacuum applied through the chamber 162 and ports 166 associated therewith.

The other cam 107, which is on the cam plate 106 and which rotatively trails the cam 105 on the plate 104, closes switch 7S having terminals 7S1, 7S2, 7S3, 7S4, 7S5 and 7S6, the terminals 7S1, 7S2 establishing an electrical path through relay 2R to cause relay 2R to become energized, normally open contacts 1R2 at this time being closed because relay 1R has picked up these contacts 1R2. It will be understood that relay 1R seals itself in through its normally open contacts 1R1 and does not depend upon the terminals 6S1, 6S2 of cam switch 6S to do so, for the cam 105 (FIG. 5) will rotate past the switch 6S. The relay 2R controls miscellaneous contacts 2R1, 2R2, 2R3, all normally open that need not be verbally described as their various roles can more easily be understood from merely looking at FIG. 18.

The cam actuated switch 6S closes for the second time after the upper spindle unit 48 has been raised so that the leading end of the tape supply 44 will remain free of any enwrapped tape due to its axially displaced relation. The closing of the switch 6S for the second time energizes through terminals 6S4, 6S5 the high speed cycle time T, time delay relay 2TDR having normally open contacts 2TDR1 (instant) and normally closed contacts 2TDR2 and 2TDR3 (on delay), and the solenoid 6K1 which causes engagement of the high speed clutch 80 so that the motor 88 then drives the spindle assembly at an accelerated rotative speed. It will also be noted that at this time the low speed clutch 68 is disengaged inasmuch as the bridging of the contacts or terminals 6S4, 6S5 cause the solenoid 4K1 to be energized, which action operates the air cylinder 69 to effect the declutching. Of course, the timer T determines the interval during which the high speed rotation prevails. At the same time, an electrical circuit is made through the solenoid 9K1 of the valve unit 9K which is responsible for actuating the swing arm assembly 95 (FIG. 5), the assembly including the arm 97 on which the switches 6S and 7S are mounted. More specifically, the piston rod 99 is urged outwardly from the air cylinder 101 so that the arm 97 is swung counterclockwise as viewed in FIG. 5 with result that the switches 6S and 7S are during the ensuing period not actuated by the cams 105 and 107, respectively.

The high speed cycle timer T times itself out and then re-energizes, through the closing of its normally open contacts T1, the slow speed clutch solenoid 4K2 while disengaging the high speed clutch 80 by way of solenoid 6K2. Concomitantly, time delay relay 4TDR, which controls normally open contacts 4TDR1 (on delay), times itself out, thereby causing the swing assembly 95 (and the switches 6S and 7S) to move inwardly because the normally open contacts 4TDR1 close to energize the solenoid 9K2.

When switch 7S closes for the second time to energize relay 3R, having normally open contacts 3R1, 3R2, 3R3, 3R4, 3R5, 3R6 and normally closed contacts 3R7, 3R8, 3R9 and 3R10, doing so through terminals 7S4, 7S5 and now closed contacts 2R2, contacts 3R4 close to energize the valve 2V which supplies vacuum to the vacuum ports 218 belonging to the shuttle body 214. It will be remembered that the same valve 2V also supplies vacuum to the vacuum shoe 196 of the knife assembly KA; however, at this stage, the shoe 196 is not holding any tape 44 but is being conditioned for accepting tape from the vacuum shoe 134 after the wound tape has been cut by the knife 192. Through the contacts 3R1, which close at this time, the electric valve 4V becomes energized to supply vacuum to the chamber 164 of the vacuum shoe 134, thus causing vacuum to be applied through the ports 168 to the section of the surface 170 which is to retain the new trailing tape end which is soon to be formed by the cutting action of the knife, 192. Next, switch 6S closes for the third time and energies relay 4R through terminals 6S4, 6S5, relay 4R having normally open contacts 4R1, 4R2, 4R3 and normally closed contacts 4R4. Contacts 4R1 open to de-energize the vacuum valve 3V controlling the vacuum to the splicing tape shuttle slide 224.

It is due to the closing of the switch 7S for its third time that the solenoid 3K2 is energized, resulting in the pawl bar 174 of the latch mechanism 172 being swung inwardly by the air cylinder 179. The dual role played by the valve unit 3K also causes the shuttle slide or advance shoe 224 to be retracted because the air cylinder 233 is supplied with air by this unit 3K, the solenoid 3K2 introducing air into the end of the air cylinder 233 through which the rod 232 projects to effect retraction of said rod and the shuttle slide 224 which is mechanically attached thereto. Still another action take place during this operational interval, the terminals 7S1, 7S2 causing the solenoid 5K2 of the valve unit 5K to be energized with the consequence that the air cylinders 37 (FIG. 3) receive air under pressure of their lower ends to return the platform 26 to its lower position against the stops 32. The upper spindle unit 48, being supported on the plate 18 is also moved downwardly.

When the pawl bar 174 of the latching mechanism 172 has been swung inwardly notches 98 and 122, the switch 5S is actuated so as to energize the solenoid 4K1 through its now closed terminals 5S1, 5S3 which results in the spindle units 46, 48 (which are now being driven at the originally slow rate of speed) to stop. Also, the arm 182 of the knife assembly is moved in because the solenoid 2K2 is energized through the same terminals 5S1, 5S3 of the switch 5S.

The switch 3S which is to complete a circuit through its terminals 3S1, 3S2 when the knife assembly KA is in, causes the time delay relay 1TDR to be energized for its second time and also relay 5R which has normally open contacts 5R1 and 5R2 and normally closed contacts 5R3. When time delay relay 1TDR times out, the knife assembly valve 2K is operated via its solenoid 2K1, the knife assembly being moved outwardly to its home position air cylinder 189 by the energization of this particular solenoid 2K1.

The next operational step that occurs is that the switch 4S is closed by virtue of the knife assembly KA reaching its home position to energize time delay relay 3TDR. Contacts 3TDR1 (which are normally closed and continue to remain closed until time delay relay 3TDR times itself out) will cause energization of electric valve 7V. The energization of the electric valve 7V results in the splicer assembly of FIGS. 8 – 12 being moved into juxtaposition (the applicator arm 244) with the severed tape ends of the magnetic tape 44 which are now in an abutting relationship by reason of having been cut by the knife edge 194 carried on the knife assembly KA.

When the time delay relay 3TDR times itself out, its normally open contacts 3TDR2 close so as to energize relay 6R. The picking up of relay 6R results in the opening of its normally closed contacts 6R2 which deenergizes solenoid valves 4V and 5V, thereby releasing the cut and now spliced ends of the tape 44 which are actually the joined or connected ends of the completed tape array or loop 44a. Also contacts 6R1 close so as to energize the electric valve 1V that supplies air to the air cylinder 265. This latter action raises the yoke 262 that in turn lifts the ejector disc 260 together with the various pins 268, 272, mounted thereon. It will be appreciated that the switch 8S is at this time actuated by reason of the splicer assembly SA reaching its home position with the result that terminals 8S1, 8S2 are connected.

When the ejector mechanism EM reaches its upper position, the switch 9S is closed, that is the terminals 9S1 and 9S2 are connected, so that solenoid valve 1K1 is energized which results in the upper spindle unit 48 being returned to its raised position due to air being supplied to the air cylinder 25.

The tape **44*a* has now been not only wound but has been properly ejected through the action provided by the thrust pins 268 and also the tapered pin 272. The elevated condition of the tape cartridge casing permits its ready removal from the machine (FIG. 17). After manually removing the completed tape cartridge TC from the lower spindle unit 46, the operator actuates the cycle reset switch 10S causing a momentary deenergization of various solenoids and relays as shown in FIG. 18. This de-energization serves to "clean" the control system so that it is ready for the next cycle. Note, that during this de-energization period (the time that switch 10S is actuated) that current is maintained to valve 2V, thus continuing to apply vacuum to chamber 200 of vacuum shoe 196, of the knife assembly KA, and thus, also to maintain or hold the tape 44** in readiness for the succeeding cycle.

Although the invention has been herein described in connection with unrecorded magnetic tape 44, such tape could be in recorded form with appropriate signals recorded thereon which indicate the ending of the recorded material, such as music. In such a situation, the high speed rotation would be terminated by the recorded signal rather than on a time basis as described. If motion picture film is being wound, then the signals would be in optical form, such as a light or dark spot and an appropriate photocell for sensing such spot or area. Other webs might have still different indicia if the wound length is important. However, winding, as far as the high speed portion of the cycle is concerned is the simplest and constitutes one feature of the present invention.

What is claimed is:

1. A splicer tape assembly comprising a shuttle mechanism pivotally mounted on a given axis including a body having a set of vacuum ports and a slide shoe also having a set of vacuum ports, means selectively applying vacuum to said sets of ports to incrementally advance a section of splicing tape, an applicator arm also pivotally mounted on said axis formed with a nozzle having a set of vacuum ports, said nozzle traversing a path in the direction of the section of tape advanced by said shuttle mechanism, a knife having a cutting edge disposed so as to enter between said nozzle and said shuttle mechanism to cut an advanced section of tape, whereby the advanced section which is severed by said knife is then moved by said nozzle on said applicator arm.

2. The splicer tape assembly set forth in claim 1 including means for actuating said arm in a direction to move said nozzle toward said knife edge, means biasing said shuttle mechanism against said arm so as to be pivotally moved therewith, and means for arresting further pivotal movement of said shuttle mechanism after severance of said advanced section of splicing tape.

3. The splicer tape assembly set forth in claim 2 in which said nozzle lies radially outwardly from said shuttle mechanism and extends laterally from said applicator arm, whereby said applicator arm and its said nozzle can continue their movement after the movement of said shuttle mechanism has been arrested.

* * * * *